(12) United States Patent
Das et al.

(10) Patent No.: US 9,766,911 B2
(45) Date of Patent: Sep. 19, 2017

(54) SUPPORT FOR A NON-NATIVE APPLICATION

(75) Inventors: Abhinav Das, Sunnyvale, CA (US);
Jiwei Lu, Pleasanton, CA (US);
William Y. Chen, Los Altos, CA (US);
Chandramouli Banerjee, Fremont, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1738 days.

(21) Appl. No.: 12/429,399

(22) Filed: Apr. 24, 2009

(65) Prior Publication Data

US 2010/0274551 A1    Oct. 28, 2010

(51) Int. Cl.
G06F 9/45      (2006.01)
G06F 9/455    (2006.01)
G06F 11/36    (2006.01)

(52) U.S. Cl.
CPC ...... *G06F 9/45504* (2013.01); *G06F 9/45516* (2013.01); *G06F 11/3612* (2013.01); *G06F 11/3636* (2013.01)

(58) Field of Classification Search
USPC ....... 714/15, 38.11; 717/131, 170, 124, 138; 703/28
See application file for complete search history.

(56) References Cited

U.S. PATENT DOCUMENTS

| | | | | |
|---|---|---|---|---|
| 7,149,929 B2* | 12/2006 | Chaurasia | ............ | G06F 11/366 714/38.11 |
| 2005/0050389 A1* | 3/2005 | Chaurasia | ............ | G06F 11/366 714/15 |
| 2005/0071824 A1* | 3/2005 | K. N. | ............... | G06F 11/3636 717/138 |
| 2007/0168979 A1* | 7/2007 | Kumar | ............... | G06F 11/3648 717/124 |

(Continued)

OTHER PUBLICATIONS

Sean Callahan Remote Debugging with Controllable Overhead Technical Report FSL-08-02, Mar. 7, 2008.*

(Continued)

*Primary Examiner* — Omar Fernandez Rivas
*Assistant Examiner* — Cuong Luu
(74) *Attorney, Agent, or Firm* — Invoke

(57) ABSTRACT

Aspects of the invention are directed to a systems and methods for operating a non-native binary in dynamic binary translation environment. In accordance with an embodiment, there is provided a computer program product in a computer readable medium. The product includes program code for receiving a non-native binary in a computer readable medium and program code for translating the non-native binary. Additionally, the product includes program code for executing the translated non-native binary, the non-native binary including one or more threads, and program code for pausing execution of the translated non-native binary. The product also includes program code for providing guest instruction boundary information to a monitoring (Continued)

process and program code for analyzing a state of each thread of the translated non-native binary. Moreover, the product includes program code for fast-forwarding at least one thread so that its state is consistent with the guest instruction boundary.

20 Claims, 6 Drawing Sheets

(56) References Cited

U.S. PATENT DOCUMENTS

| | | | |
|---|---|---|---|
| 2008/0270107 A1* | 10/2008 | George | G06F 9/455 |
| | | | 703/28 |
| 2009/0210649 A1* | 8/2009 | Wan | G06F 9/30087 |
| | | | 711/170 |
| 2010/0223600 A1* | 9/2010 | Shafi | G06F 11/3636 |
| | | | 717/131 |

OTHER PUBLICATIONS

Kumar et al. Tbd: A Source-Level Debugger for Dynamically Translated Programs ACM 1-59593-050-07/05/0009, Sep. 2005, pp. 1-10.*

Callahan Remote Debugging with Controllable Overhead Technical Report FSL-08-02, Mar. 7, 2008, pp. i-43.*

Author Unknown, "man pp. 4: File Formats," http://docs.sun.com/app/docs/doc/802-1930-04/6i5u966p4?a=view, 12 pages, at least as early as Feb. 25, 2009.

* cited by examiner

SUPPORT FOR A NON-NATIVE APPLICATION

CROSS-REFERENCE TO RELATED APPLICATIONS

The following related applications are incorporated by reference in their entirety and for all purposes: U.S. patent application Ser. No. 12/264,943, filed Nov. 5, 2008 and entitled, "Handling Signals And Exceptions In A Dynamic Translation Environment"; U.S. patent application Ser. No. 12/264,944, filed Nov. 5, 2008 and entitled "Handling Mutex Locks In A Dynamic Binary Translation Against Heterogeneous Computer Systems"; and U.S. patent application Ser. No. 12/345,810, filed Dec. 30, 2008 and entitled, "Dynamic Translator For Requests For System Resources."

FIELD OF THE INVENTION

Aspects of the present invention relate to operating computer applications in a non-native environment. More particularly, aspects of the present invention relate to supporting a non-native application in a translation environment.

BACKGROUND

There are several different computing architectures prevalent today. Generally, each architecture has software applications and programs that are specifically created to properly operate within that particular architecture. When the applications operate in an architecture they were designed to operate within, it is commonly referred to as operating in a "native" environment. However, it may be beneficial or desirable to operate some programs in a non-native environment, i.e., in an architecture for which they were not specifically designed.

Binary translation and, specifically, dynamic binary translation provides translation of binary code so that applications may operate in a non-native environment. A guest process running on a host system through a dynamic translator may appear as a native process to the host operating system. The host system may have little or no knowledge that the process is being translated. However, architectural differences may make it difficult to monitor, debug, and/or control the guest process.

SUMMARY

Aspects of the invention are directed to systems and methods for operating a non-native binary in dynamic binary translation environment. In accordance with an embodiment, there is provided a computer program product in a computer readable medium. The product includes program code for receiving a non-native binary in a computer readable medium and program code for translating the non-native binary. Additionally, the product includes program code for executing the translated non-native binary, the non-native binary including one or more threads, and program code for pausing execution of the translated non-native binary. The product also includes program code for providing guest instruction boundary information to a monitoring process and program code for analyzing the state of each thread of the translated non-native binary. Moreover, the product includes program code for fast-forwarding at least one thread so that its state is consistent with the guest instruction boundary.

In another embodiment, there is provided a system of monitoring non-native binaries executed in a dynamic binary translation environment. The system includes a translator for translating a non-native binary and a processor for executing the translated non-native binary, wherein the processor is configured to pause execution of the translated non-native binary. Additionally, the translator is configured to export a set of information about the non-native binary to a computer readable medium while the non-native binary is in a paused state.

In yet another embodiment, there is provided a computer system that includes a machine readable medium having computer executable instructions stored thereon. The system includes a processor and a machine readable medium comprising code executable by the processor. When executed by the processor, the code may translate a guest executable binary to a host executable binary and export information about the guest executable binary to a location in the machine readable medium accessible to other executable binaries.

DETAILED DESCRIPTION

In accordance with the present disclosure, there are provided techniques to overcome some architectural issues that may make it difficult to monitor and/or control a non-native application operating in a non-native environment. In one embodiment, a binary translator may export information to a page located in memory or to another binary translator so that the information may be used in monitoring or controlling the non-native application. For example, the binary translator may export details regarding an emulated state of the non-native application, including the location of a code cache and an in-memory emulated state for each thread, so that a register map may be generated and made available to other applications. For the purposes of the disclosure, a thread may be considered an instance of a process and multiple threads of a single process may be running at any given time.

In another embodiment, post-processing code is provided to bring a monitored process to a state consistent between a host and a guest. In yet another embodiment, pre-processing code is provided to update a code-cache to reflect changes made to an address space of the non-native application by the monitoring process. The changes are then translated and provided to the host prior to running the process again.

Hence, the following description sets forth various embodiments in three sections: 1) exporting information not available or derivable from a native system, 2) maintaining a consistent state, and 3) accounting for modifications to the address space. The disclosed techniques alone and in combination provide for aspect of control and monitoring of non-native guest applications in an unmodified host operating system. Furthermore, the monitoring application maintains the consistency between the host and guest and, thus, the monitored application is not burdened with additional tasks. Various embodiments are described in greater detail in each of their respective sections, preceded by an overview of examples of systems and tools that may be used to perform the techniques disclosed herein.

Figure 1:
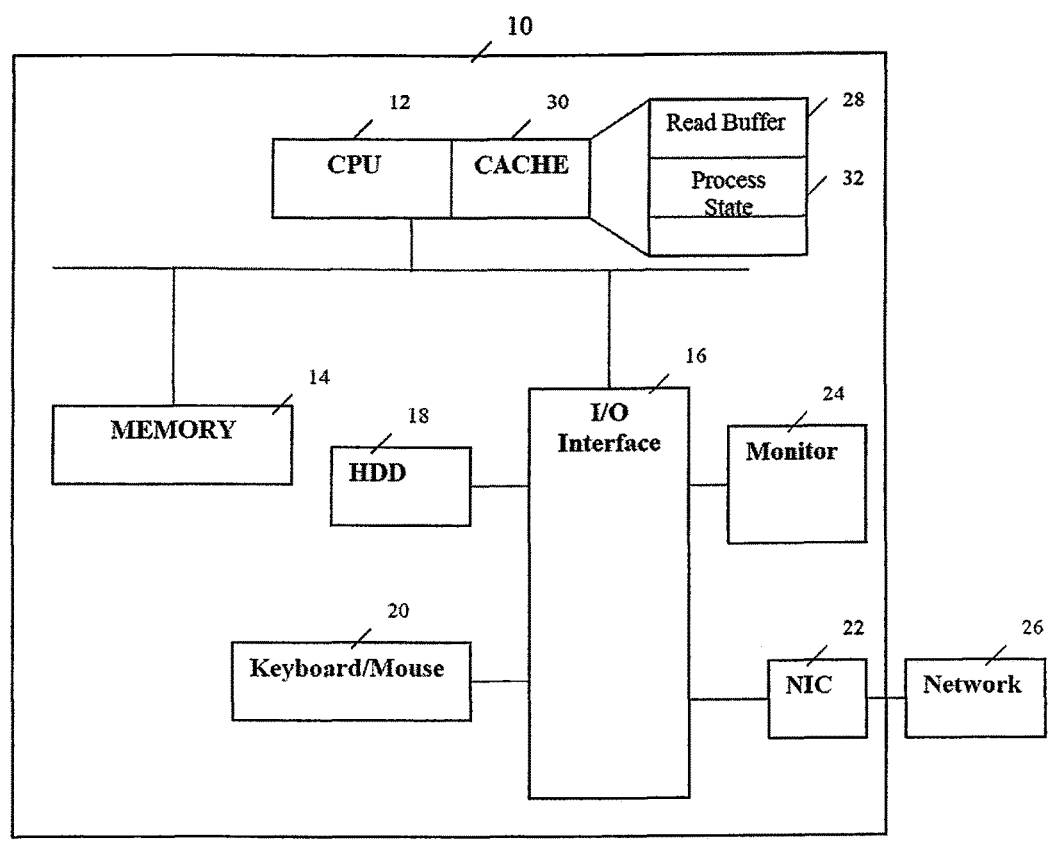
FIG. 1 illustrates a computer system in accordance with an example embodiment of the present disclosure.

FIG. 1 illustrates a host computer system 10 for executing a non-native application in accordance with an embodiment of the present disclosure. The host computer system 10 may include a central processing unit CPU 12 which is communicatively coupled to a memory 14 and a I/O interface 16. The CPU 12 may be one or more commercially available computer processors or processing cores, such as those manufactured by Intel or Advanced Micro Devices, for example. The memory 14, may include a form of random access memory (RAM) such as dynamic RAM or static RAM, for example. The I/O interface 16 may be coupled to various i/o devices such as a hard disk drive 18, a keyboard and/or mouse 20, a network interface device 22, and a monitor 24, for example. The network interface device 22 may allow for the computer system 10 to communicate over a network 26 with other computer systems or devices.

The host computer system 10 may be configured in accordance with a host computer architecture which may be defined by both the computer hardware implemented in the system 10, as well as the operating system running on the host computer system 10. Examples of hardware architectures include RISC, CISC and MIPS architectures and, more specifically, may include Sparc and Intel x86 platforms. Operating systems that commonly run on these particular hardware architectures include, Solaris, Linux, Windows, etc. A kernel of the operating systems generally provide tools used to evaluate the status of the operating system and the applications or processes currently running. For example, POSIX operating systems such as Linux and Solaris provide two mechanisms for one process to control and/or monitor another process. In a POSIX system, IO control operations (ioctl calls) on a file system called "/proc" may be used to control and/or monitor other processes, as can reading and writing special files created for each running process in the /proc file system. For additional information about the /proc file system reference may be made to *Solaris 2.5 Reference Manual AnswerBook*, available at www.sun.com, which is incorporated by reference herein in its entirety and for all purposes.

The /proc file system is a pseudo-file system, meaning files created inside the /proc file system do not exist or reside on the hard disk drive 18. The operating system emulates file operations in the /proc file system that may be used to monitor or control processes. For example, a file called "/proc/1000/pstatus" may exist in the /proc file system for process id 1000. This file represents the current state of the process 1000. When a read operation is called on this file, the operating system fills a read buffer 28 that may be in a cache 30 of the processor 12 with an in-kernel process state 32. Another example is "/proc/1000/ctl," which is a pseudo file that accepts control messages from the write system call. Control messages have predefined formats for various operations such as stop the process, run the process, change the register contents of a stopped process, etc. Yet another example is "/proc/1000/as," which is used to read from or write to the address space of process id 1000.

Proc ioctl operations, which are input/output control operations within the /proc file system, have similar equivalents to the above pseudo files and, hence, may similarly be used to monitor processes executing on the host computer system 10. For example, "ioctl(fid, PIOCSTATUS, buffer)" may be used to obtain the status of a process. The file id ("fid") can be obtained by opening "/proc/1000," for example, for the process 1000. The proc ioctls provide the same functionality as the proc file system but the control and monitor operations are carried out through IO control operations rather than reading or writing of pseudo files.

Enabling the use of the /proc file system and proc ioctl operations in adopting dynamic binary translation allows for the development and testing of applications in a non-native environment. More particularly, as non-native /proc tools are used to monitor and control the non-native processes, the native tools remain unmodified. The native operating system is not aware of the architectural considerations of the non-native application and the dynamic translator is responsible for maintaining these considerations even in the presence of fine grained control with the native operating system.

A. Exporting Information

Figure 2:
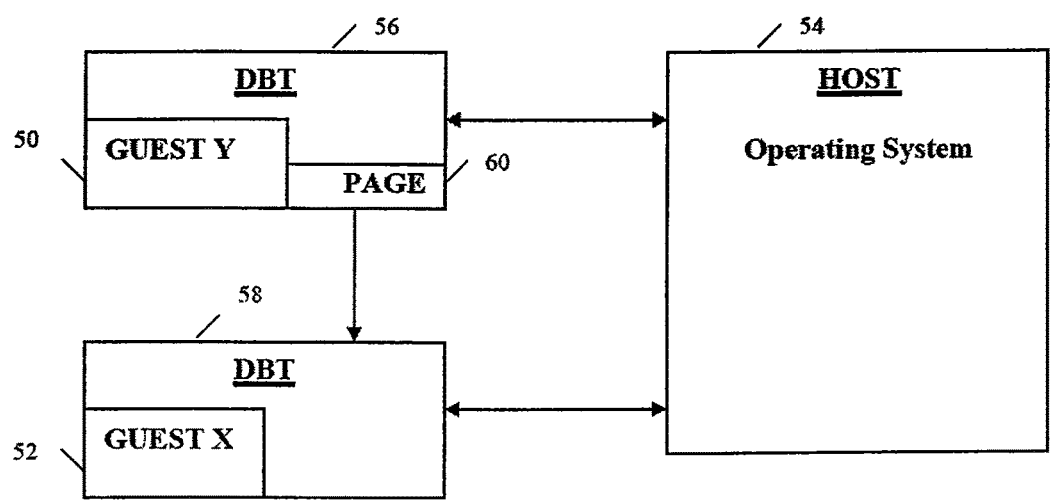
FIG. 2 is a block diagram of non-native guest processes operating on a host in accordance with an embodiment of the present disclosure.

FIG. 2 illustrates a block diagram of guest processes 50 and 52 operating in a host operating system 54 through dynamic binary translators 56 and 58. The guest processes may be applications that were not specifically designed to operate within the host operating system 54. Through binary translation completed by the binary translators 56 and 58, however, the guest processes 50 and 52 may appear as a native processes to the host operating system 54 and, thus, the host operating system 54 may have little or no knowledge that the processes 50 and 52 are being translated.

For the purposes of this discussion, the guest process 50 is being monitored by guest process 52. Thus, guest process 52 may be a debugger such as dbx, gdb or mdb, for example, or other application that can monitor and/or control another process. Generally, a process may be monitored and/or controlled by a first process issuing a set of commands for a second process indicating that it be notified when a particular event happens on the second process. For example, process 52 can ask for notification on signal SIGINT on process 50. The kernel stops or freezes the process 50 when it detects that a SIGINT has been delivered to the process 50. The kernel then updates its data structures to reflect that a signal (SIGINT) has to be delivered when the process 50 starts running again. In the meantime, the process 52 may be either polling or executing a blocking system call that is unblocked only when process 50 is stopped. For example, the ioctl(fid, PIOCWSTOP, arg) waits for process 50 to stop and only returns when process 50 is stopped (or if the ioctl is interrupted by some other event in process 52). Once process 52 is unblocked, it inspects the status of process 50 by reading the /proc/pid/status file or by an ioctl operation, for example. The status file may contain the register state of the guest process 50, in addition to other information. Because the guest process 52 used to monitor and control the process 50 is also translated, i.e., non-native, details of the underlying dynamic translator 56 can be hidden.

Alternatively, a native monitoring and/or controlling tool may be implemented. If native tools, such as a host debugger (not shown), are used to monitor and control the translated process they may have limited success, as the host tools will not understand the non-native architecture state, which is needed to fully enable monitoring and/or controlling of the non-native process. Specifically, the host debugger will receive a native register state but the correspondence between host and guest registers for an emulated process is known only to the emulator running the guest process. In order to fully monitor and control the guest process, the host debugger will need to understand implementation details of the binary translation. the host debugger will also present details of the dynamic binary translation that may be irrelevant to a user developing non-native applications using dynamic binary translation.

There are several pseudo files in the proc file system, some containing architecture specific information and others that are architecture neutral. The architecture neutral files may be relatively easy to handle, as the binary format of the buffer may simply be adjusted. Different architectures such as UltraSPARC and x86 may have different alignment and size (in bytes) requirements for different fields of a data structure. For example, "struct {int a, double b}" can have a size of 12 bytes and is aligned on 4-byte boundary, whereas on UltraSPARC it can have a size of 16 bytes and is aligned on 8-byte boundary. Also, the in-memory data structure representation may be different due to different endian-ness. Such data structures require modification of the date read from the proc files before supplying the data to the non-native debugger.

Figure 3:
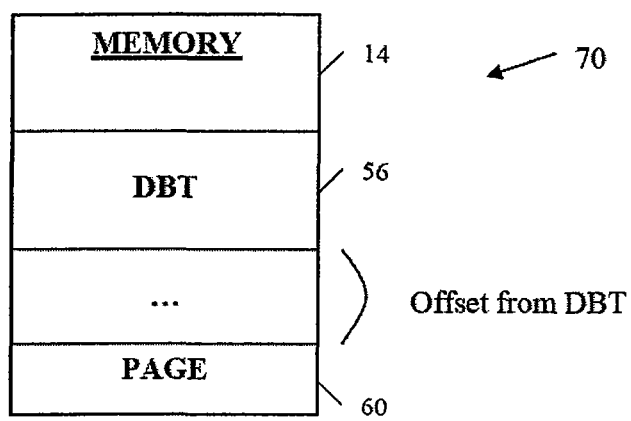
FIG. 3 is a block diagram of memory having a dynamic binary translator and a page located an offset from the translator in memory in accordance with an embodiment of the present disclosure.

For files that contain architecture specific information, the detailed information (e.g., location of code cache and in-memory emulated state for each thread, etc.) may be extracted from the in-memory state of the binary translator 56. The binary translator 56 may then export information about the emulated state and other details of the translation so that another binary translator 58 can use the information. The information may be exported in a page 60 allocated by the translator 56 at a location relative to where the translator 56 is loaded in memory 18. FIG. 3 illustrates a memory stack 70 having a dynamic binary translator 56 and a page 60 located and referenced as an offset from the memory location of the dynamic binary translator 56. The page 60 can be found quickly by reading information available to the native /proc file system. More specifically, the location where the binary translator 56 is loaded is known, as it is stored by the host operating system 54 and made available by reading the /proc/pid/auxv file. Thus, the page 60 can be accessed with a fixed offset from that location.

The information that is passed in the page 60 includes details about the emulator such as, the location of a code-cache, the location of an in-memory emulated state for each thread and other information. Any information that is not available or derivable from the native proc file system may be made available through this page 60. For example, page 60 provides a map for correlating registers and memory locations between the host 54 and the guest process 50. Information pointed to by page 60 can be read by opening the /proc/pid/as file of the process 50 that is being monitored.

Page 60 contains a data structure that points to internal information of the binary translator. For example, the page 60 may contain information about the current state of DBT 56, such as, "translating code," "executing system call," and "executing in code-cache," among others. The page 60 is implementation specific protocol so that DBT 58 understands the state of DBT 56. The layout of the page 60 can start with a 4-byte header ('p,' 'r,' 'o,' 'c'), followed by a pointer to an instruction boundary map, followed by a pointer to a thread state. This, however, is simply one example of an organization scheme and other schemes may be possible and may present different information and/or pointers in a different order, for example.

B. Maintaining a Consistent State

In addition to exporting information between the host and guest, post-processing of an executed process may fast-forward the executing process to a consistent state between the host and guest. As used herein, the term "fast-forward" may be used to describe executing a thread of a process to an instruction boundary that is common for both a non-native process and the translation of the non-native process after execution of the thread has been stopped. For a native process in a native environment, a single instruction is either executed fully or not executed at all. However, a single non-native process instruction (e.g., from guest process 50) may be translated into multiple instructions in a translated process, i.e., the binary translator 56 may convert one guest instruction into several host (native) instructions.

Figure 4:
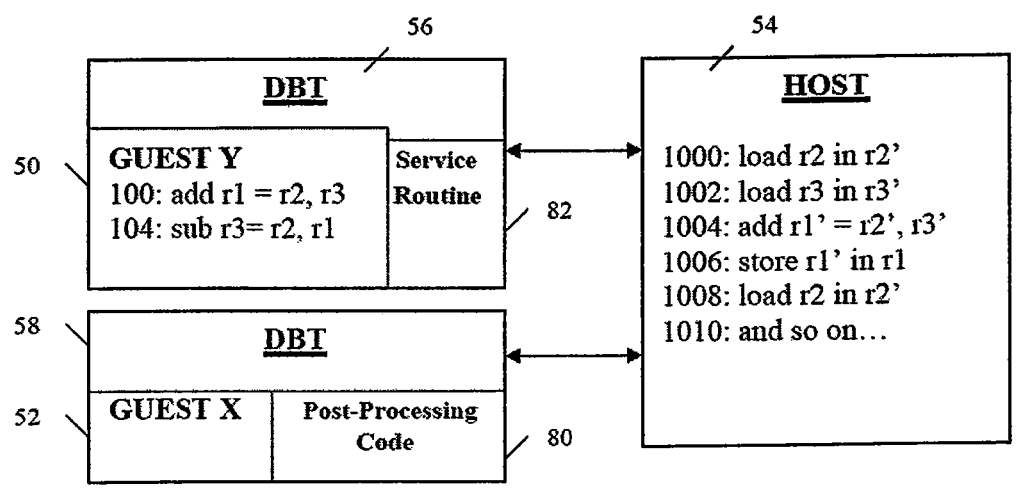
FIG. 4 is a block diagram of the non-native guest process and host of FIG. 2 illustrating granularity differences between guest process instructions and translated instructions.

FIG. 4 illustrates a translation of sample code from the guest process 50 to the host 54 via the dynamic binary translator 56. As can been seen, two lines of code in the guest process 50 when translated may be expanded to five or more lines of code for the host 54. Thus, the guest process 50 instructions are expanded to host instructions in the code-cache 30. As will be appreciated to those of skill in the art, the cache 30 may be integrated with the CPU 12 or, in some embodiments, may be a discrete component. It is possible that the guest process 50 is stopped in the middle of some guest instruction, possibly because of the receipt of some signal. For example, process 52 can asynchronously stop process 50 and request register state information. If, for example, a stop command is issued to the host operating system 54 by process 52 for process 50, process 50 is stopped by the system at host machine instruction level granularity. So, the process 50 could be stopped in the middle of executing a guest instruction, a possibility that does not occur when process is executed in a native environment. Since the monitored guest process 50 is stopped by the kernel, the process 50 is frozen in an inconsistent state with the translated process on the host 54. The monitoring application 52 may read the emulated register state and receive intermediate values, as the guest instruction is only partially complete.

If the monitoring application is native to the host system, it will receive native register states but the correspondence between host and guest registers for an emulated process is known only to the emulator running the guest process. If the debugger is also a guest process, then the read of status file can be intercepted and the emulated register state can be placed in the read buffer of the debugger. However, the emulator running the debugger should know where to look for the emulated register state in the emulator running the process.

Post-processing code 80 in the monitoring guest process 52 may remedy the issue. The post-processing 80 code may be activated when the monitoring guest process 52 is informed that the monitored process 50 has stopped. The post-processing code 80 analyzes the state of each thread of execution in the monitored process 50 and brings it to a consistent state. There may be several challenges in doing this. Specifically, information regarding a guest instruction boundary should be passed to the monitoring application 52. The guest instruction boundary indicates the stopping point of the guest process 50 instructions. For example, there is a guest instruction boundary after instruction 100, however, the host 54 may have only executed instruction line 1002 before stopping. The monitoring application 52 can then use the guest instruction boundary information and commands in the native /proc file system to bring the execution of the particular thread to the instruction boundary, i.e., through host instruction 1006.

In addition to the process being stopped in the middle of execution of a translated instruction, it is also possible that the monitored process 50 is stopped inside a service routine 82 in the binary translator 56. The service routine 82 might have some locks that are shared across multiple threads. Thus, information is exported out in such a way so as to allow the monitoring application to "fast-forward" each thread of the monitored application 50 to reach a consistent state, i.e., a state that is consistent between both the host 54 and the guest processes 50.

A service routine may contain several hundred or thousands of instructions. "Fast forwarding," may be practical for relatively few of these instructions. When DBT 56 is in a service routine, it may be updating critical information about the emulated and, hence, should be allowed to complete before DBT 58 can interrupt that information. In on example, bringing DBT 56 to a consistent state may include clearly providing state information about DBT 56, as described above, along with points of execution where DBT 56 is consistent. DBT 58 can then use native proc commands to wait for DBT 56 to reach those consistent points. An example of a consistent point is a point where no thread of DBT 56 is in a service routine.

Figure 5:
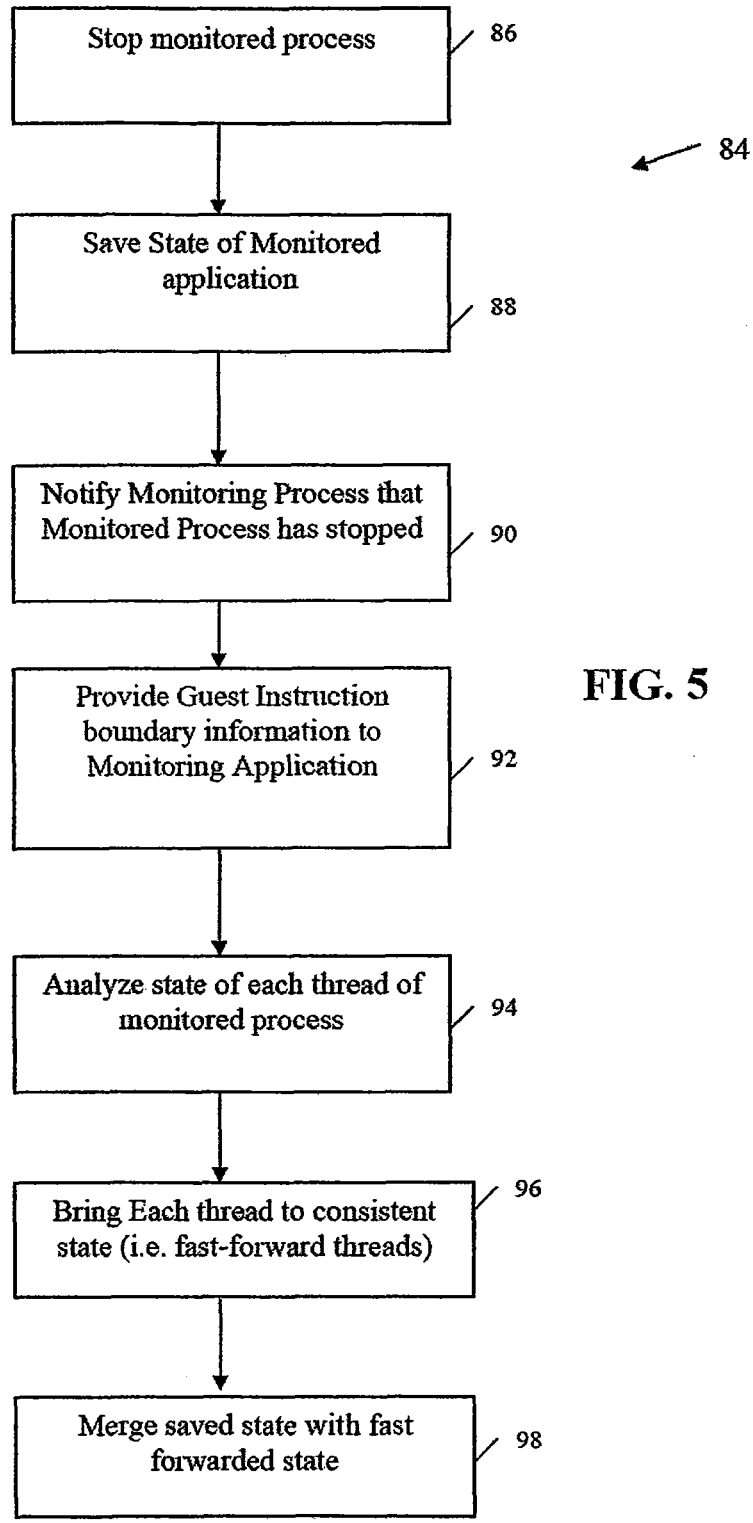
FIG. 5 is a flowchart illustration of a technique to bring threads of a translated process to a consistent state in accordance with an embodiment of the present disclosure.

A technique 84 to achieve a consistent state is illustrated as a flowchart in FIG. 5. Once a process has stopped execution (block 86), the state of the monitored application is saved (block 88). For example, if the monitored process is stopped on a signal, the state reflects that it is stopped on a signal. The signal may be any event or message passed to the process from the operating system to redirect execution of the process. In some cases the signal may be issued as a result of user input, e.g., mouse click, ctrl +c, etc. The monitoring process is notified upon issuance of signal that the monitored process has been stopped (block 90) and the guest instruction boundary information is provided to the monitoring application (block 92) or to a location in memory accessible to the monitoring application. The monitoring process analyzes the state of each thread of the monitored process (block 94) and fast-forwards the threads to a consistent state (block 96). The saved state of the monitored application is then merged with the post fast-forward state (block 98) so that upon re-starting the process, the process is consistent at the host and guest instruction boundaries and with the state at which it was stopped.

C. Accounting for Modification of the Address Space

The address space of guest process 50 can be modified by process 52 at any time by controlling execution of the process 50 and writing to the address space ("as") file in the /proc file-system for process 50. Address space modification is not an issue for data sections as long as guest instruction granularity is maintained but address space modification for a text section is cause for concern. Specifically, referring again to FIG. 4, it is possible that the controlling process 52 stops the process 50 at the end of guest instruction 100 and at end of 1006 in the host 54. The controlling process 52 changes the address space at location 104 to a different instruction and issues a command to continue execution. Hence, the text section of the guest process 50 was modified but the host program counter is at 1008 and ready to run the old instruction. On native systems this is not an issue as the hardware can run the modified instruction directly. However, on a translated process, the translator 56 should to be made aware of the change.

Figure 6:
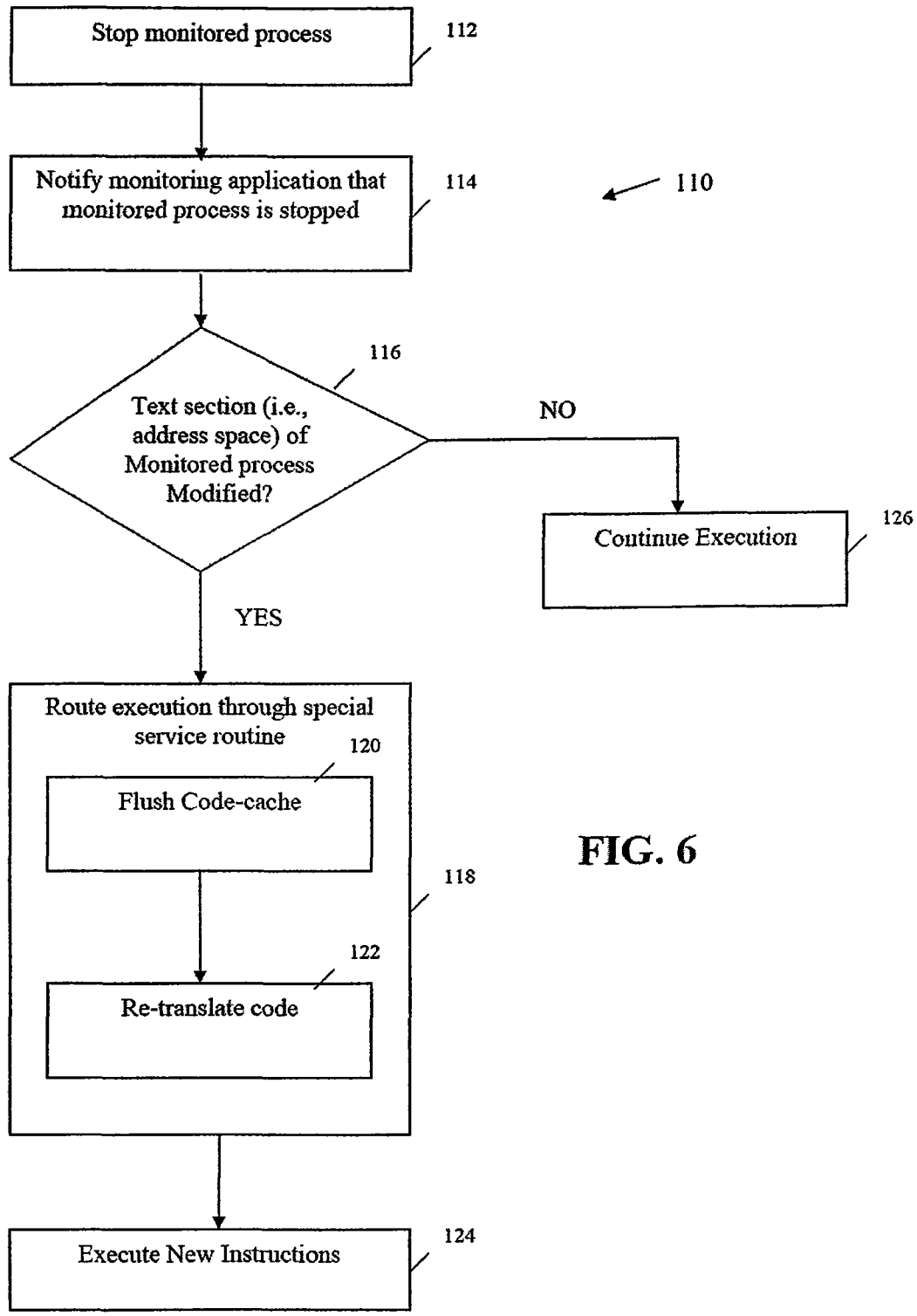
FIG. 6 is a flowchart illustrating a technique for managing changes to an address space of a non-native guest process executed in a dynamic binary translation environment.

FIG. 6 is a flowchart illustrating a technique 110 for updating the code-cache. As before, the monitored process is stopped (block 112). The monitoring application 52 may be notified that the monitored process 50 is stopped (block 114) and the state of each thread is made consistent, as discussed above with reference to FIG. 5. Changes may be made to the text section, thus it is determined whether the guest monitoring application 52 made changes to the text section (block 116) before continuing execution. This may be accomplished by monitoring the reads and writes to the /proc/pid/as file of the monitored application 50. If the monitoring process 52 writes to the /proc/pid/as file, then execution is redirected to a special service routine that handles the changes (block 118). The special service routine may include flushing the code-cache (block 120) and retranslating the code (122) so the host 54 may execute the new instructions (block 124). If no change has been made to the text section, then execution may continue without being routed through the special service routine (block 126).

In another embodiment, the monitoring application 52 may insert breakpoints and replace a regular instruction with a special trap instruction. Replacing a regular instruction with a debugger trap instruction may be a general mechanism used by a debugger to stop execution of a monitored process at a particular place during execution. As this is a general mechanism used by native debuggers, dynamic binary translators should have support for such changes to the address space of non-native applications.

When the executed guest process reaches the special trap instruction, the special trap instruction stops execution of the process 50 and notifies the monitoring application 52. The monitoring application 52 replaces the trap instruction with the original instruction before continuing execution, thus avoiding the confusion of different instructions at the host and the guest. For example, if a debugger wants to inspect the state of an application at the beginning of function "foo," the debugger may replace the trap instruction with the original instruction and start execution from the replaced instruction.

Pre-processing before the start of monitored process to account for any changes made to a text section of a guest process, post-processing to bring threads to a consistent state after stopping the guest process, and exporting information not available or derivable from a native /proc file system, a guest process may be executed, monitored, and controlled in a non-native, binary translation environment. Additionally, the use of "proc tools" translated on a dynamic binary translator and used to monitor and control a translated process requires no modification in the tool itself and the binary translator performs all extra handling.

The foregoing merely illustrates certain principles and aspects with reference to implementations that conform to concepts disclosed herein. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention. Hence, it will be appreciated that those skilled in the art may devise numerous systems, arrangements and methods which, although not explicitly shown or described herein, embody the principles of the invention and, thus, are within the spirit and scope of the present invention.

The invention claimed is:

1. One or more non-transitory computer readable media comprising instructions which, when executed by one or more hardware processors, cause performance of operations comprising:

translating a non-native binary using a binary translator to obtain a translated non-native binary, wherein a particular non-native binary instruction is translated to a plurality of translated non-native binary instructions, and wherein an instruction boundary associated with the particular non-native binary instruction corresponds to a last instruction in the plurality of translated non-native binary instructions;

beginning execution of the translated non-native binary on a host operating system;

during execution of a particular translated non-native binary instruction of the plurality of translated non-native binary instructions: receiving a command to pause execution of the translated non-native binary;

responsive to receiving the command: pausing execution of the translated non-native binary after executing the particular translated non-native binary instruction of the plurality of translated non-native binary instructions and before executing a next instruction of the plurality of translated non-native binary instructions;

determining, by a monitoring process, that the execution of the translated non-native binary has not been paused at any instruction boundary associated with the non-native binary;

causing, by the monitoring process, execution of at least the last instruction of the particular plurality of translated non-native binary instructions to reach the instruction boundary associated with the particular non-native binary instruction; and pausing execution of the translated non-native binary when the last instruction has been executed to reach the instruction boundary associated with the particular non-native binary instruction.

2. The media of claim 1, wherein the operations further comprise: saving a state of the non-native binary after pausing execution of the translated non-native binary when the last instruction has been executed to reach the instruction boundary associated with the particular non-native binary instruction.

3. The media of claim 1, wherein the operations further comprise: exporting, to the monitoring process, a state of the non-native binary after pausing execution of the translated non-native binary when the last instruction has been executed to reach the instruction boundary associated with the particular non-native binary instruction.

4. The media of claim 3 wherein the monitoring process comprises a non-native process different than the non-native binary.

5. The media of claim 1, wherein the operations further comprise:

determining if an address space of the non-native binary has been modified; and routing execution of the translated non-native binary through a special service routine if the address space is modified.

6. The media of claim 5 wherein routing execution of the translated non-native binary through the special service routine comprises:

flushing cache code; and translating the address space of the non-native binary that has been modified.

7. The media of claim 5 wherein determining if the address space of the non-native binary has been modified is based on a /proc/pid/as file of the non-native binary.

8. A system comprising:

at least one device including a hardware processor; and the system configured to perform operations comprising:

translating a non-native binary using a binary translator to obtain a translated non-native binary, wherein a particular non-native binary instruction is translated to a plurality of translated non-native binary instructions, and wherein an instruction boundary associated with the particular non-native binary instruction corresponds to a last instruction in the plurality of translated non-native binary instructions;

beginning execution of the translated non-native binary on a host operating system;

during execution of a particular translated non-native binary instruction of the plurality of translated non-native binary instructions: receiving a command to pause execution of the translated non-native binary;

responsive to receiving the command: pausing execution of the translated non-native binary after executing the particular translated non-native binary instruction of the plurality of translated non-native binary instructions and before executing a next instruction of the plurality of translated non-native binary instructions;

determining, by a monitoring process, that the execution of the translated non-native binary has not been paused at any instruction boundary associated with the non-native binary;

causing, by the monitoring process, execution of at least the last instruction of the particular plurality of translated non-native binary instructions to reach the instruction boundary associated with the particular non-native binary instruction; and pausing execution of the translated non-native binary when the last instruction has been executed to reach the instruction boundary associated with the particular non-native binary instruction.

9. The system of claim 8 wherein the operations further comprise: exporting a register state of the non-native binary after pausing execution of the translated non-native binary when the last instruction has been executed to reach the instruction boundary associated with the particular non-native binary instruction.

10. The system of claim 9 wherein the register state is exported to an offset address relative to a binary translator in a computer readable medium.

11. The system of claim 8 wherein the operations further comprise: reading a register state of the non-native binary by opening a /proc/pid/as file of the non-native binary.

12. The system of claim 8, wherein the operations further comprise: reading, by a second non-native binary, a register state of the non-native binary.

13. The media of claim 1 wherein the instruction boundary associated with the particular non-native binary instruction indicates a stopping point in the plurality of translated non-native binary instructions.

14. The media of claim 1, wherein the operations further comprise: exporting a state of the non-native binary, after pausing execution of the translated non-native binary when the last instruction has been executed to reach the instruction boundary associated with the particular non-native binary instruction, to an offset address relative to a binary translator.

15. A method, comprising:

translating a non-native binary using a binary translator to obtain a translated non-native binary, wherein a particular non-native binary instruction corresponds to a particular plurality of translated non-native binary instructions, and wherein an instruction boundary associated with the particular non-native binary instruction corresponds to a last instruction in the particular plurality of translated non-native binary instructions;

beginning execution of the translated non-native binary on a host operating system;

during execution of a particular translated non-native binary instruction of the plurality of translated non-native binary instructions: receiving a command to pause execution of the translated non-native binary;

responsive to receiving the command: pausing execution of the translated non-native binary after executing the particular translated non-native binary instruction of the plurality of translated non-native binary instructions and before executing a next instruction of the plurality of translated non-native binary instructions;

determining, by a monitoring process, that the execution of the translated non-native binary has not been paused at any instruction boundary associated with the non-native binary;

causing, by the monitoring process, execution of at least the last instruction of the particular plurality of translated non-native binary instructions to reach the instruction boundary associated with the particular non-native binary instruction; and pausing execution of the translated non-native binary when the last instruction has been executed to reach the instruction boundary associated with the particular non-native binary instruction;

wherein the method is performed by at least one device including a hardware processor.

16. The method of claim 15, further comprising: exporting, to the monitoring process, a state of the non-native binary after pausing execution of the translated non-native binary when the last instruction has been executed to reach the instruction boundary associated with the particular non-native binary instruction.

17. The method of claim 16, wherein the monitoring process comprises a non-native process different than the non-native binary.

18. The method of claim 15, further comprising:
determining whether an address space of the non-native binary has been modified; and
routing execution of the translated non-native binary through a special service routine if the address space is modified.

19. The method of claim 18, wherein routing execution of the translated non-native binary through a special service routine comprises:
flushing code cache; and
translating the address space of the non-native binary that has been modified.

20. The method of claim 18, wherein determining whether the address space of the non-native binary has been modified is based on a prod/pid/as file of the non-native binary.

* * * * *